United States Patent [19]
Taylor

[11] Patent Number: 5,702,614
[45] Date of Patent: Dec. 30, 1997

[54] FLUID TREATMENT METHOD

[76] Inventor: Jeffrey Robert Taylor, 1 Princess St., New Victoria 3158, Australia

[21] Appl. No.: 571,935

[22] PCT Filed: Jul. 4, 1994

[86] PCT No.: PCT/AU94/00368

§ 371 Date: Jan. 4, 1996

§ 102(e) Date: Jan. 4, 1996

[87] PCT Pub. No.: WO95/01936

PCT Pub. Date: Jan. 19, 1995

[30] Foreign Application Priority Data

Jul. 5, 1993 [AU] Australia ................................ PL9778

[51] Int. Cl.⁶ ........................................................ C02F 1/58
[52] U.S. Cl. ................ 210/738; 210/724; 210/747; 210/749; 210/170; 210/192; 210/198.1; 210/206; 210/242.1; 210/906; 210/912; 422/265; 422/271; 422/272
[58] Field of Search .................................. 210/702, 724, 210/738, 747, 749, 170, 192, 198.1, 206, 242.1, 906, 912; 422/265, 269–273

[56] References Cited

U.S. PATENT DOCUMENTS

| | | | |
|---|---|---|---|
| 1,406,525 | 2/1922 | Bouillon | 422/272 |
| 2,546,317 | 3/1951 | Prizer | 422/269 |
| 3,142,639 | 7/1964 | Baer et al. | 210/60 |
| 3,161,352 | 12/1964 | Mollring | 422/269 |
| 3,199,957 | 8/1965 | Vivion | 422/27 R |
| 3,758,276 | 9/1973 | Bond et al. | 23/267 A |
| 3,861,654 | 1/1975 | Singleton | 259/89 |
| 4,244,656 | 1/1981 | Hohlbaum | 422/272 |
| 4,681,948 | 7/1987 | Worley | 210/764 |
| 4,683,062 | 7/1987 | Krovak et al. | 210/617 |
| 4,798,707 | 1/1989 | Thomas et al. | 422/265 |
| 4,822,579 | 4/1989 | Wagner | 210/198.1 |
| 4,856,909 | 8/1989 | Mehta | 366/208 |
| 5,053,205 | 10/1991 | Taylor et al. | 210/198.1 |
| 5,089,120 | 2/1992 | Eberhardt | 210/242.1 |
| 5,185,085 | 2/1993 | Borgren | 210/747 |
| 5,256,309 | 10/1993 | Makino | 210/747 |

FOREIGN PATENT DOCUMENTS

| | | | |
|---|---|---|---|
| J5 5001-826 | 9/1980 | Japan . | |
| 55-149687 | 11/1980 | Japan | C02F 1/58 |
| 55-162396 | 12/1980 | Japan | C02F 3/08 |
| 58-27689 | 2/1983 | Japan | C02F 1/62 |
| 58-40194 | 3/1983 | Japan | C02F 3/08 |
| 61-293356 | 12/1986 | Japan | B01F 1/00 |

Primary Examiner—Peter A. Hruskoci
Attorney, Agent, or Firm—D. Peter Hochberg; Mark Kusner

[57] ABSTRACT

A device for treating fluid, particularly polluted water such as add-sulphate water. The device includes a stainless steel chamber which is provided with buoyancy pontoons allowing it to float in communication with the polluted water in a reservoir. The chamber is provided at both ends with openings which allow water to flow freely into and out of the chamber for treatment. A trap door provides an entry for water treatment reagent and a motor and gearing system rotates the chamber about its axis. The rotation of the chamber combined with the action of the internal mixer flights serve to agitate the water and reagent mix with a milling action.

19 Claims, 7 Drawing Sheets

FLUID TREATMENT METHOD

FIELD OF THE INVENTION

This invention relates to methods of improving the quality of fluids.

BACKGROUND TO THE INVENTION

There is a continual need for more efficient and effective methods for treating and improving the quality of water. Increasingly stringent waste water standards demand that contaminated liquid effluent from mining, quarrying, processing, manufacturing or agricultural operations be adequately treated prior to release.

Sulphate and/or phosphate polluted water are typical examples of fluids requiring treatment. Acid-sulphate water is generated by a variety of mining/quarrying operations and other industrial processes. Such water constitutes a hazard due to its low pH (high acidity) and the concomitant high concentrations of toxic inorganic components (e.g. arsenic, cadmium, iron, copper, lead, zinc, cobalt, aluminium, manganese and nickel . . . etc). These contaminants may render the water unsafe for domestic or livestock consumption and irrigation purposes, and unsuitable for release into rivers, sewers or storm-water systems. Phosphate-enriched water can be generated by natural drainage from land subjected to modern agricultural practices, and is also derived from human and animal sewage/effluent; excess water-borne phosphate can encourage the growth of toxic algal blooms.

Calcium-based water treatment compounds such as calcium carbonate, calcium oxide (lime) and calcium hydroxide are amongst the most common, inexpensive and useful water treatment agents for both sulphate and phosphate enriched waters.

For example, one approach to the treatment/neutralisation of acid-sulphate water involves the addition of calcium hydroxide ($Ca(OH)_2$) or calcium oxide ($CaO$) and may be represented by the following reactions;

(Sulphuric Acid)    (Calcium Hydroxide)  (Gypsum)

or (Sulphuric Acid)    (Calcium Oxide)    (Gypsum)

The dissolution of calcium hydroxide or calcium oxide in acid-sulphate water not only increases its pH to more acceptable levels, but simultaneously lowers the concentration of toxic metal components. This is achieved by the co-precipitation of a range of metals (commonly as hydroxide compounds) with the gypsum (calcium sulphate).

These neutralisation reactions are generally extremely rapid, and thin but impermeable rinds or precipitates of compounds such as gypsum and co-deposited metal hydroxides can readily coat the surfaces of particles of treatment reagents such as calcium oxide, calcium hydroxide or calcium carbonate. These coatings can prevent total dissolution of the calcic compounds, thereby dramatically diminishing their neutralising/treatment capacity and often halting the neutralisation/treatment process.

In phosphate-bearing waters, thin but impermeable precipitates of compounds such as calcium phosphate (i.e. hydroxy-apatite) may form rapidly around particles of some treatment reagents such as calcium oxide. These processes inhibit complete dissolution of the calcium oxide, thereby retarding its capacity to fully treat the water.

Existing water treatment methods that encounter problems associated with deleterious precipitates remain inefficient, and consequently much more calcium-based or other treatment agents, are utilised in treatment situations than is theoretically required.

In addition to the formation of deleterious precipitates, some treatment reagents are subject to additional handling difficulties which are the result of their chemical properties. Calcium oxide, as a prime example, is commonly used in a range of water treatment applications due to its effectiveness, relatively low cost and relatively high theoretical solubility in most types of water. These desirable characteristics are offset by the handling difficulties encountered when this material is added to water in an attempt to form a calcium hydroxide solution/suspension. The hydration of calcium oxide to calcium hydroxide is a highly exothermic process, and in some circumstances may be rapid and progress to completion. However, when calcium oxide is added to a volume of water well in excess of its requirement to fully hydrate, as is generally the case with calcium oxide treatment plants, it becomes "drowned". This means that the surface of the calcium oxide material becomes hydrated but the remainder tends to remain impervious to further water penetration. Complete hydration is retarded or prevented, and the resulting putties or partially cemented accumulations represent a significant handling problem. Thorough hydration can only be achieved by vigorous mixing and disaggregation of such mixtures, necessitating relatively large-scale, purpose-built equipment with appropriate power requirements and significant staff supervision. The cost of establishing, operating and maintaining such equipment often counteracts the cost benefits of utilising calcium oxide.

Prior Art

The problem of deleterious precipitates coating the surface of particles of treatment reagents is rarely addressed comprehensively in the design of water treatment systems. Sometimes the problem is overcome by mixing the treatment reagents with an unpolluted water source, and then dosing the polluted water with the resultant solution/suspension. Engineering solutions designed to assist the disaggregation of precipitate-coated treatment particles are uncommon, relatively ineffective and generally expensive. The more typical water treatment plants that suffer from these problems remain relatively inefficient (in terms of reagent use), and produce significant quantities of largely unusable precipitated-coated "reagent sludge". Because of this they are commonly labour intensive and necessitate ongoing operational/maintenance costs.

In order to overcome the tendency of the treatment reagents such as calcium oxide to form lithified masses, large and complex mixing/stabilisation/agitation/dosing plants requiring significant capital investment have been constructed. These treatment plants have been designed to facilitate the disaggregation of the lithified masses that develop when the reagent is added to water.

Typically such plants may comprise at least a two stage treatment facility, the first stage consisting of a large fixed mixing vat provided with an agitator and a reagent storage and feeding system. The first stage is used to thoroughly mix the reagent perhaps in clean water to produce a solution/suspension which is then fed to the second stage which consists of an agitation chamber where polluted water which has been pumped from a holding reservoir is treated with the solution/suspension after which it is pumped back to the reservoir or some other facility.

In addition to the major costs involved in building such facilities, they suffer from the disadvantages that they are dedicated single-reagent systems, commonly suffer from sludge development problems, don't fully address the problems associated with inefficient use of treatment reagents (i.e. deleterious precipitates), require large inputs of energy to thoroughly hydrate and keep reagent solids in solution/suspension, may need to use an extraneous source of unpolluted water, generally require extensive pumping and piping systems, are not transportable and are generally labour intensive.

It is an object of the invention to provide a process and apparatus which significantly ameliorates one or more of the foregoing difficulties.

SUMMARY OF THE INVENTION

The present invention provides:
a device for treating fluids comprising
a chamber,
drive means adapted to rotate the chamber about an axis,
loading means arranged to facilitate supply of treatment reagent into said chamber,
holding means for supporting the chamber in a fluid reservoir,
inlet/outlet means adapted to allow fluids from the fluid reservoir to pass into said chamber, and to facilitate return of fluids treated in said chamber into said fluid reservoir.

The present invention also provides a method for treating fluids comprising suspending a chamber in a reservoir of fluid, flowing fluid from the reservoir into the chamber and back into the reservoir, adding fluid treatment reagent to the chamber and agitating the mixture of fluid and reagent.

PREFERRED ASPECTS OF THE INVENTION

Preferably the device is a cylinder closed off by circular ends and said inlet/outlet means comprise one or more openings provided in one or both circular ends.

The loading means preferably comprises a trap door provided in the wall of the cylinder.

Alternatively the loading means may comprise a chute adapted to feed reagent through an opening provided in one of the circular ends.

Preferably the device includes two buoyancy pontoons provided with a supporting structure for holding a shaft on which said chamber is mounted for axial rotation about said shaft.

The device may include flow means comprising:
a motorised paddle provided adjacent one end of said chamber and/or,
a spiral water impellor provided along the axis of rotation of the chamber and/or,
a pump for pumping fluid through the chamber, and/or
flights provided on the outer surface of the ends of the chamber.

In a particularly preferred aspect the present invention provides a device having a durable rotating cylindrical chamber (perhaps comprised of stainless steel), capable of rotating around an axis through the centre of the circle defining the cylinder, which performs the task of a quasi-autogenous mill. The chamber is mounted on a flotation unit permitting the system to operate directly on a body of affected water. The flotation unit comprises buoyancy pontoons comprised of an acid- and alkali-resistant, lightweight, UV-radiation tolerant, durable material (e.g. some plastics, wood). The cylindrical chamber is fixed with its rotational axis parallel to the horizontal and is partially submerged in the body of affected water, such that the rotational axis lies close to the surface of the water. Openings in the chamber are at both ends, and are small enough to permit the chamber to accommodate quantities of a treatment reagent and abrasive agent, and large enough to permit a significant fluid flow through the chamber. The chamber is rotated by coupling with an electric motor. Electricity could be supplied by any suitable means such as a grid supply, a generator (e.g. hydrocarbon or wind powered) or a conventional battery recharged by a photo-voltaic cell system. Coupling between the chamber and the motor is by way of a flexible, corrosion-resistant resilient belt system.

Quantities of a suitable water treatment reagent (e.g. limestone, calcium oxide, calcium hydroxide..etc) and if required an appropriate abrasive material (e.g. relatively hard material such as quartz or glass) may be loaded into the chamber through a hinged trap door, or any other suitable access point. Access to the trap door may be facilitated by a service platform forming part of or installed on top of the flotation unit. The service platform can be comprised of any suitable, acid- and alkali-resistant, UV-radiation tolerant durable material.

Water treatment methods of the current invention may utilise suitable pumping systems to provide turbulence within the chamber in order to assist the mixing/stabilisation/hydration/dissolution of the treatment reagents during and immediately after being loaded into the chamber. In the case of water treatment methods of the current invention utilising reagents which commonly result in handling difficulties (e.g. calcium oxide), such a mixing system may prevent or minimise these problems (e.g. lime "drowning").

When the drive system is activated the chamber may be capable of rotating, and the speed of rotation may be variable.

In the hypothetical situation of using calcium oxide to treat acid-sulphate fluids, as the chamber rotates the calcium oxide becomes disaggregated and mixed, and begins to dissolve. As dissolution progresses, gypsum and other metal hydroxide rinds/precipitates may form rapidly around calcium oxide particles. Both calcium oxide and such precipitates are relatively soft (hardness of 2–3 on Moh's scale) and will be easily abraded by a common abrasive agent (e.g. quartz has a hardness of 7 on Moh's scale) as it is mixed.

Internal mixer flights comprising strategically located and proportioned ledges fixed to the inner wall of the chamber may be used to facilitate mixing of the solids (e.g. treatment and abrasive agents) as the chamber rotates.

In situations calling for the utilisation of reagents which may conventionally result in handling difficulties (e.g. lime "drowning") or develop deleterious precipitates encasing reagent particles, the rotation action of the chamber and associated action of the entrained solids in water treatment methods of the current invention will overcome these problems.

The hardness contrast between the treatment reagents/deleterious precipitates and abrasive agents will ensure that fresh reagent is available for dissolution at all times.

Reagent dissolution rates may be controlled by three main factors:
the rotation rate of the chamber,
the nature of the treatment reagent (e.g. calcium oxide, calcium hydroxide, limestone, carbide lime, caustic magnesia, magnesite, dolomite, alum, biogenic carbonate, witherite, barium oxide, sodium hydroxide, activated carbon products etc), and the hardness, density, shape and relative abundance of the abrasive agent.

As the water treatment reagent dissolves, a treatment solution (e.g. calcium hydroxide) is generated within the chamber. A uni-directional fluid-flow system may be established within the chamber with the aid of a spiral-shaped impellor system which may be located along all or part of the central rotation axis. This spiral impellor may assist water to be drawn into and through the chamber, and facilitate the dispersion of treatment solution into the affected water. A series of external mixer flights may be located at both the fluid input and output ends of the chamber. These may be designed to reinforce the uni-directional flow regime for the water treatment method, and may further enhance turbulence and fluid mixing around the chamber. The spiral impellor and external mixer flights may have the effect of mixing the surface layer of water in a broad zone around the water treatment system. On bodies of polluted/affected water with large surface areas, the zone of influence of the treatment system may be varied by changing its moored location.

In circumstances where large volumes of water or rapid treatment is required, water treatment methods of the present invention may facilitate rapid dispersion of treatment reagents into the affected water by utilising motorised dispersion paddles, suitable pumping and related discharge systems, or any other appropriate means. The pump-related discharge systems may take the form of irrigation spray dispensers. The chamber and reagent dispersion system of the present invention may or may not be powered by the same motor. A suitable pumping system may be the same as that used for creating turbulence within the chamber during loading of the treatment reagents, or could be completely independent.

The dispersion system may have the effect of treating the water in a broad zone around water treatment system of the current invention, and the zone of influence may be varied by changing the configuration of the dispersion system (e.g. pump size and irrigation spray settings).

In some situations the chamber of water treatment methods of the present invention may be rotated by manual labour, water power or any other suitable means.

In some situations coupling between the chamber and the motor may be by way of a direct-drive cog system or any other suitable means.

In some situations the abrasive agent may be replaced by high density, hard circular balls (e.g. steel) designed to disaggregate/crush the water treatment reagent. In these situations, no internal mixer flights may be required on the inside wall of the chamber. These situations may arise when the water treatment reagent is in a fine-grained form which is not amenable to significant fluid-supported abrasion, but which may be amenable to further comminution by high density, hard circular aggregates. In these situations, the chamber of water treatment methods of the present invention will be performing the task of a ball mill.

In some situations the chamber may require filtering devices with a very fine mesh size to be fitted over the apertures which permit fluid to enter and escape from the chamber. These filters may minimise the loss of undissolved water treatment reagent that may potentially escape as fine particulate, generated by water turbulence within the rotating chamber.

Water treatment methods of the present invention may be used for total remediation of an affected/polluted body of fluid or for pre- or supplementary treatment, or as emergency relief due to plant failure or unseasonal climatic conditions. They are particularly suitable in relation to treatment of acid or phosphate polluted or turbid or discoloured water or water having excessive dissolved solids.

Most conventional treatment methods are single reagent systems, designed to cater for the handling characteristics of a specific reagent and dedicated to the dispersion of that material alone. Water treatment systems of the present invention may be capable of using and dispensing a range of treatment reagents.

Water treatment systems of the present invention can have several advantages over conventional water treatment methods since they may not require complex pumping or mixing/stabilisation equipment or the establishment of a large immobile plant, may provide more efficient use of calcium-based water treatment reagents, are simple to operate and can be tended by unskilled personnel, may operate automatically, are capable of utilising a broad range of water treatment reagents, may be small and relatively easy to maneuver in and out of the water and may be easily transported to different sites without the need for dismantling, may assist with treatment scenarios requiring water aeration, may not require the construction of intermediate mixing ponds or need to use extraneous sources of unpolluted water, can be relatively small and have low power requirements by capitalising on the buoyancy effect of water.

A specific exemplary water treatment method in accordance with this invention will now be described with the aid of the accompanying drawings

INTEGER LIST
1. Stainless Steel Chamber
2. Axis of Rotation of Chamber
3. Buoyancy Pontoon
4. Variable Speed Motor
4a. Gearing System
5. Trap Door for Loading Reagents
6. Motorised dispersion paddle
7. Service Platform
8. Support Frame For Motor and Gearing System
9. Internal Support Rods for Rotational Axis
10. Internal Mixer Flights
11. Spiral Water Impellor
12. Pulley System 13. Flexible Belt Drive System
14. Full Extent of Sidewall to Chamber
15. Approximate Water Level
16. Maximum Solids Level in Chamber
17. Inlet/outlet opening

DETAILED DESCRIPTION WITH RESPECT TO THE DRAWINGS

The water treatment device of the present invention may be placed on a body of polluted or affected water. Buoyancy pontoons 3 will permit the cylindrical chamber 1 to float. The cylindrical chamber 1 will contain an axis of rotation 2 which is attached to the chamber 1 via internal support rods 9.

Since the chamber 1 contains water inlets/outlets 17 in the form of circular apertures at both ends, it will fill with water to the level indicated by the reference numeral 15.

Figure 2:
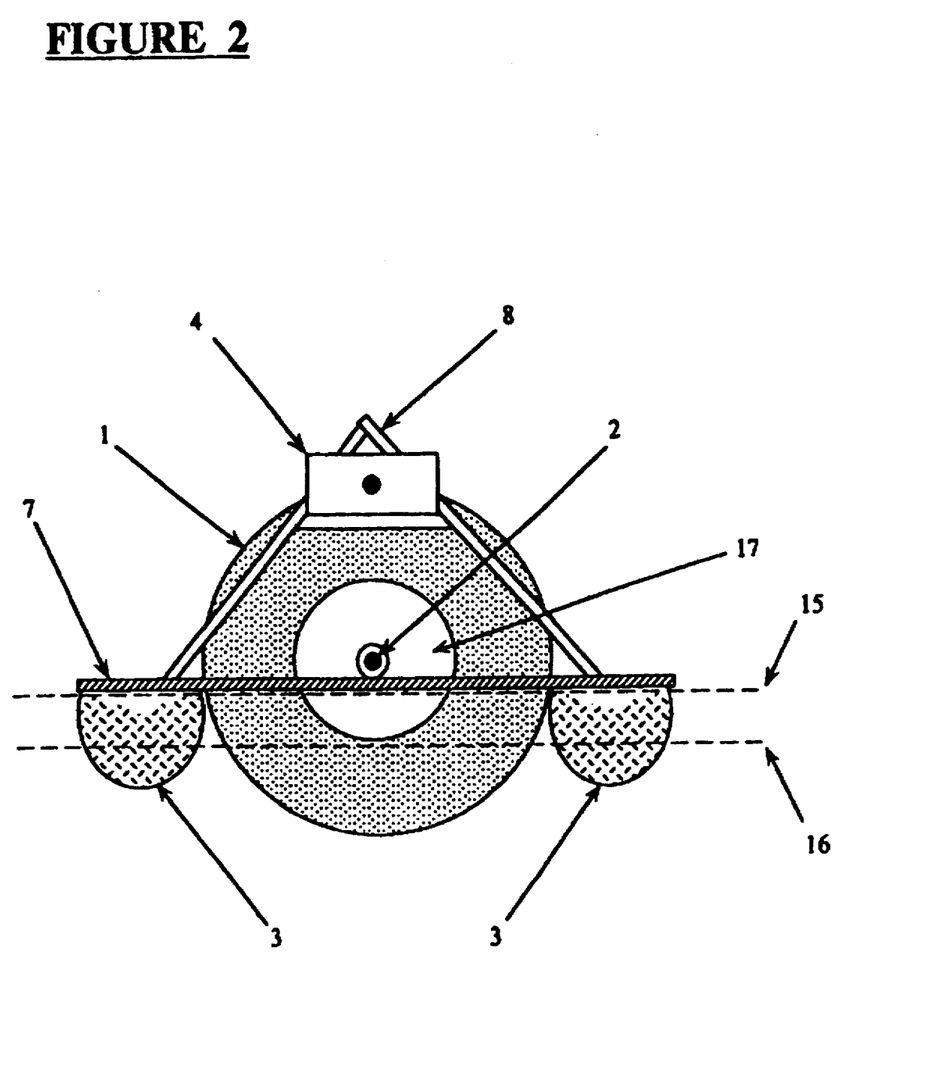
FIG. 2 is a schematic depiction of the front view of the water treatment device shown in FIG. 1.
Figure 2A:
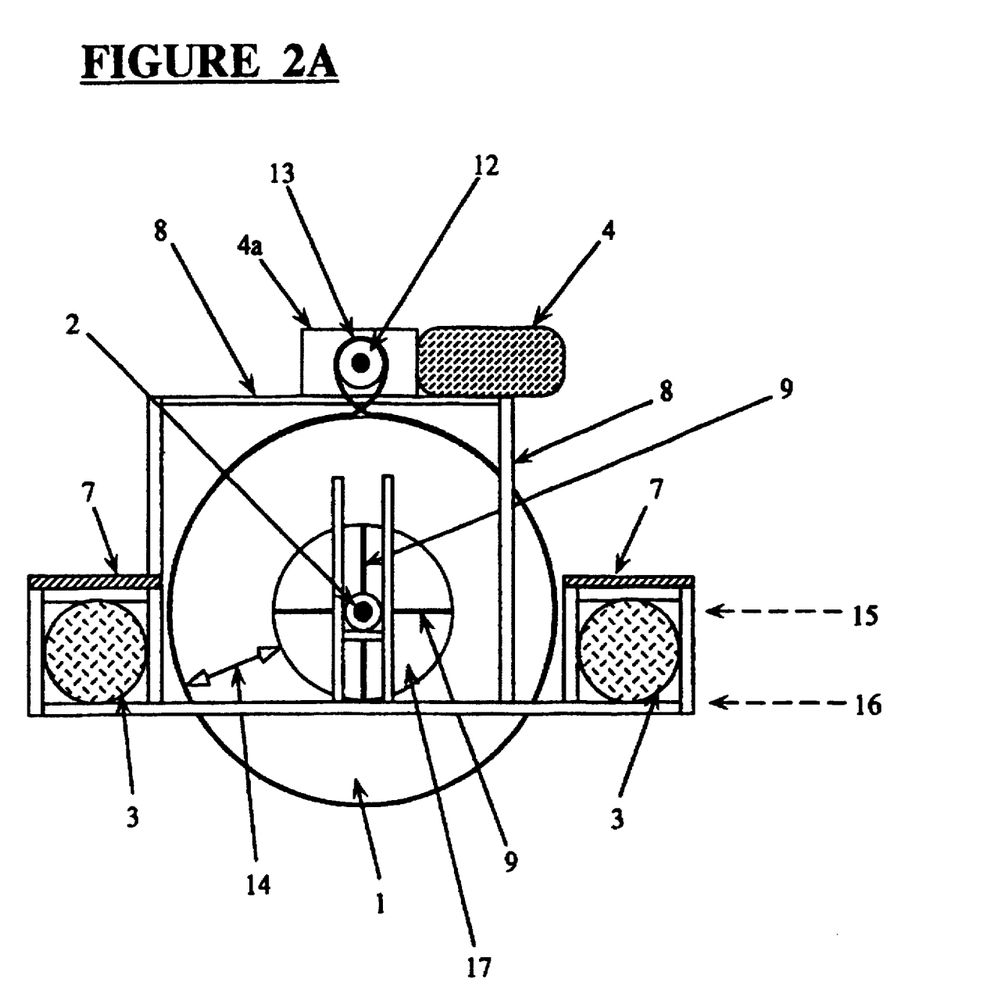
FIG. 2A is a schematic depiction of a modified alternative device to that shown in FIG. 2 and is a front view of FIG. 1A.
Figure 4:
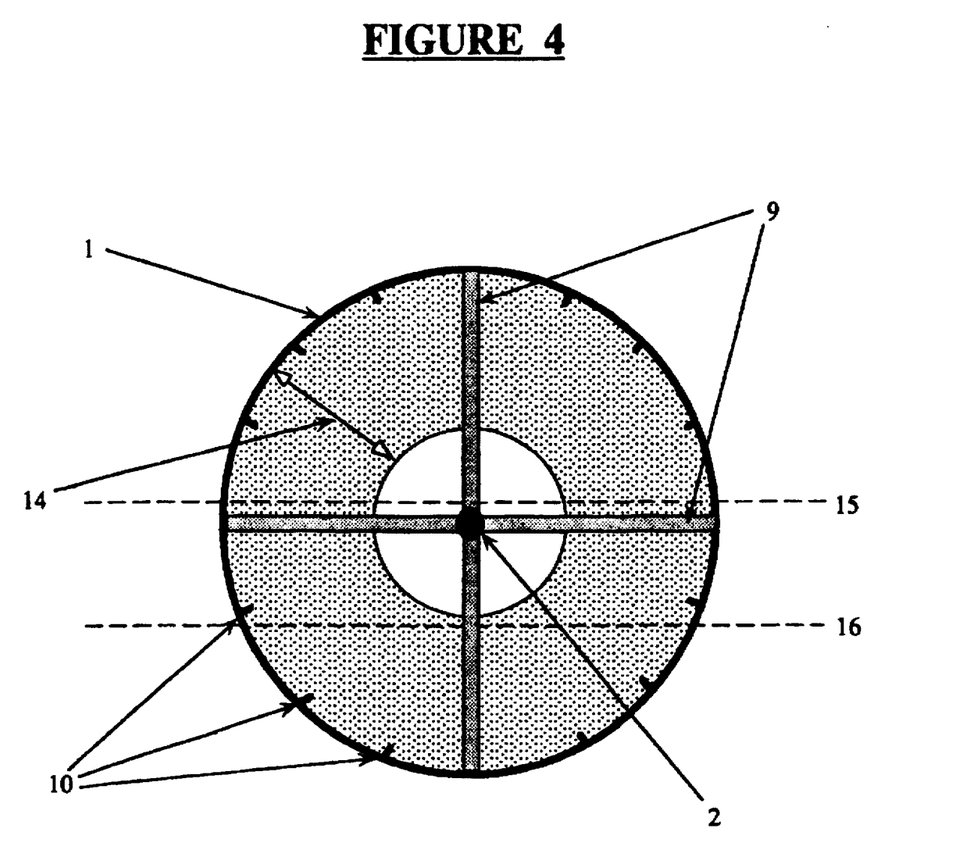
FIG. 4 is a schematic depiction of a latitudinal cross-section of the cylindrical chamber of the water treatment device shown in FIGS. 1A and 2A.

Quantities of water treatment reagent and abrasive material (where appropriate) maybe loaded into the chamber 1 via a trap door 5 up to the level indicated 16 in FIGS. 2, 2a and 4 with the assistance of a service platform 7. Alternatively a chute (not shown) for delivering reagent through the inlet/outlet opening 17 may be used. The maximum level of solids 16 capable of being accommodated in the chamber will be controlled by the position of the edge of the inlet/outlet opening 17 although it may be possible to fill to a higher level if a fine mesh screen is applied thereover.

When the drive motor 4 and attached gearing system 4A is activated, the pulley system 12 will drive the flexible belt drive system 13 and cause the cylindrical chamber 1 to rotate around its axis 2. Water treatment reagent and abrasive material will be thoroughly mixed by internal mixer flights 10, and the water treatment reagent will begin to dissolve.

Any impermeable rinds/precipitates that may form on calcium-bearing water treatment agents for example will be progressively eroded and reformed as the chamber 1 rotates. Quantities of water treatment reagent will always be exposed and available for dissolution at some point in the chamber 1.

Figure 1:
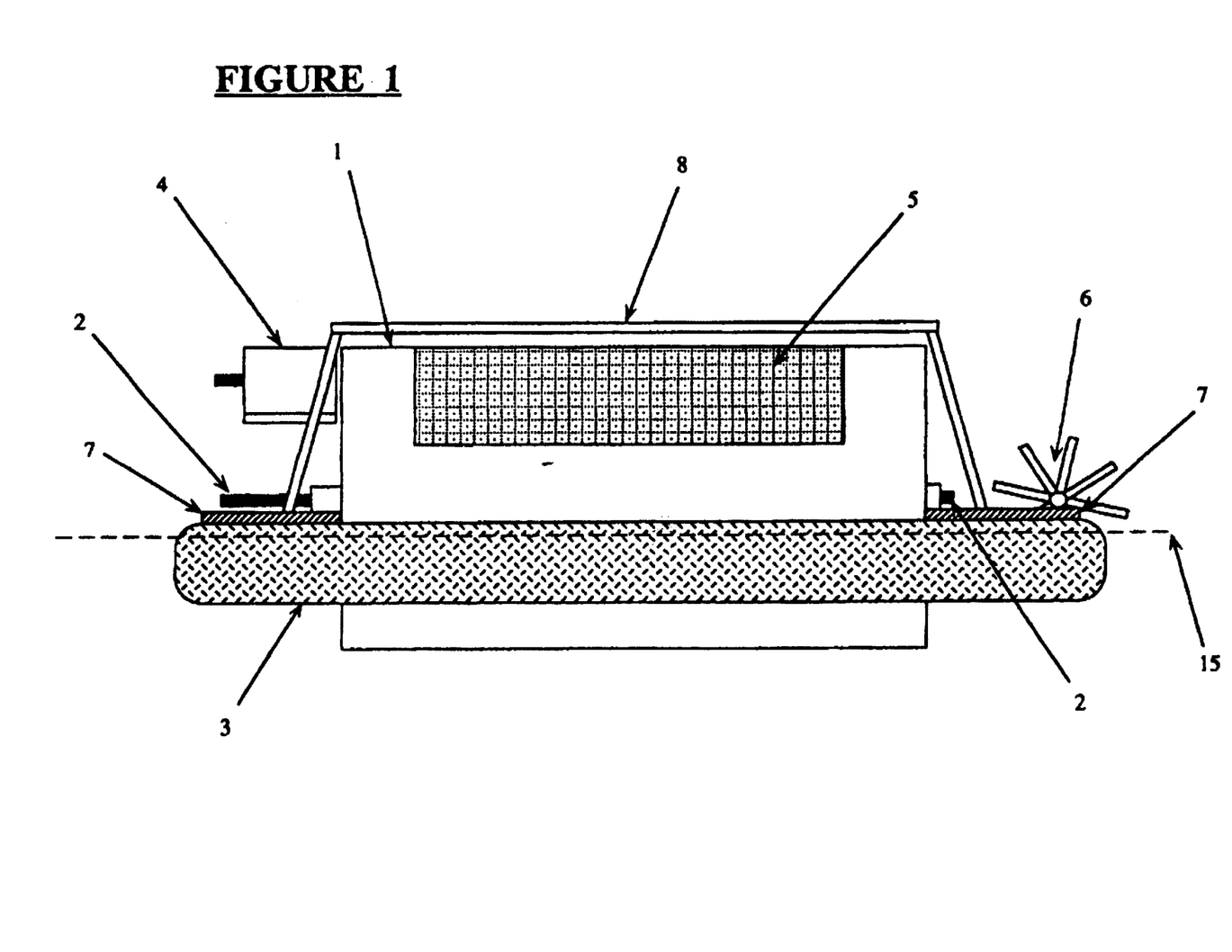
FIG. 1 is a schematic depiction of the side view of a water treatment device in accordance with this invention.
Figure 1A:
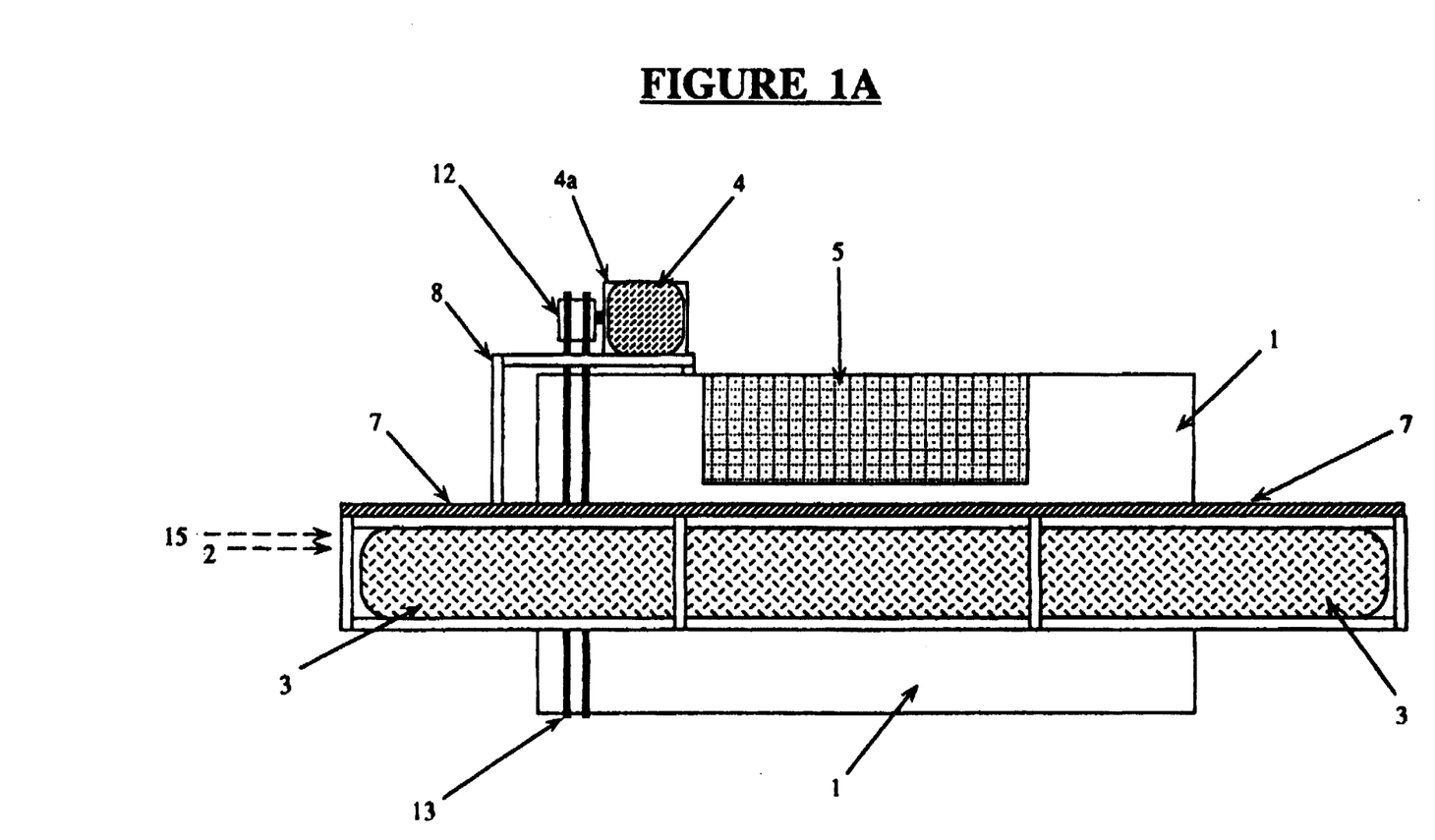
FIG. 1A is a schematic depiction of a modified alternative device to that shown in FIG. 1.
Figure 3:
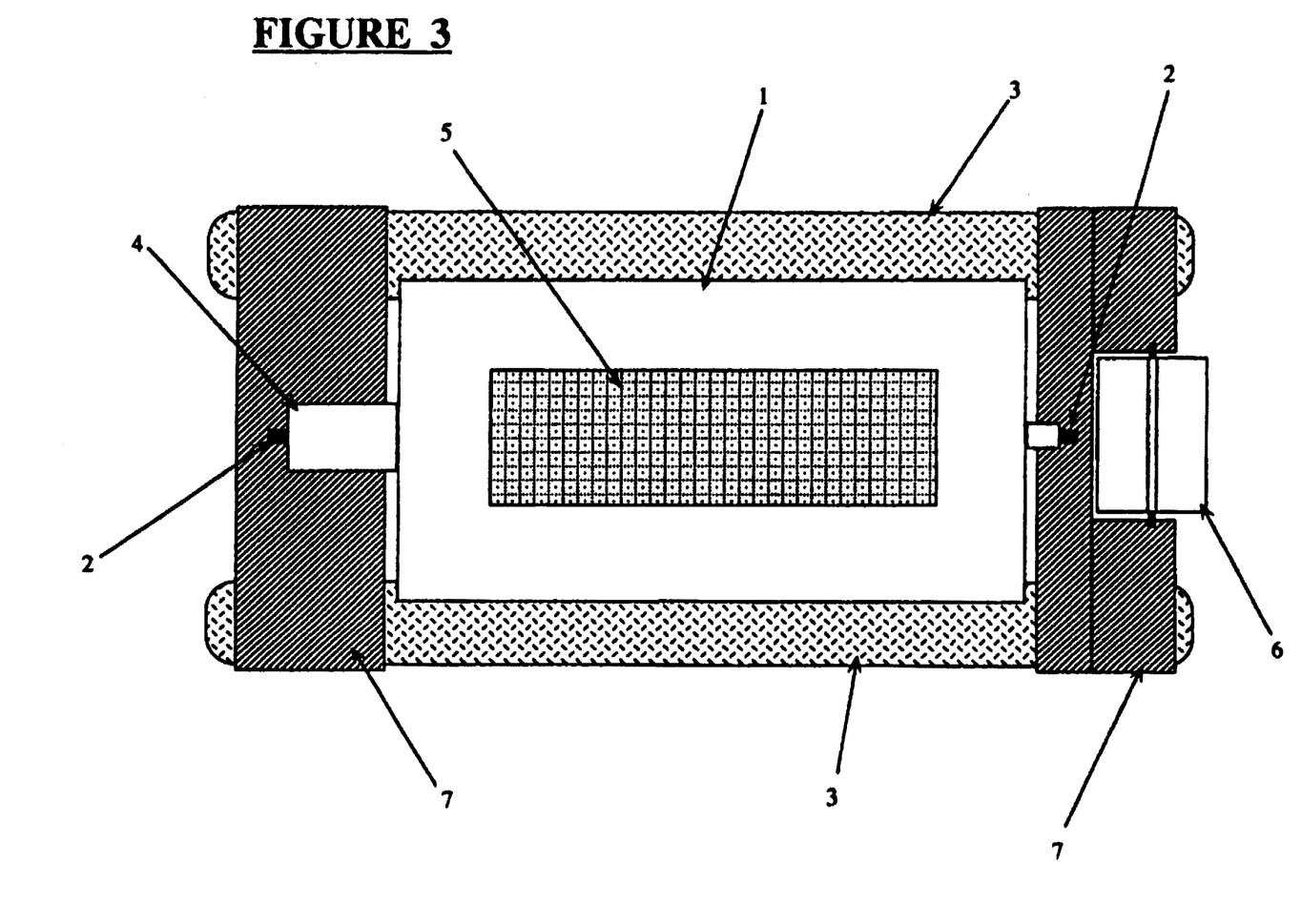
FIG. 3 is a schematic depiction of the plan view of the acid-fluid neutralisation system shown in FIGS. 1 and 2.
Figure 5:
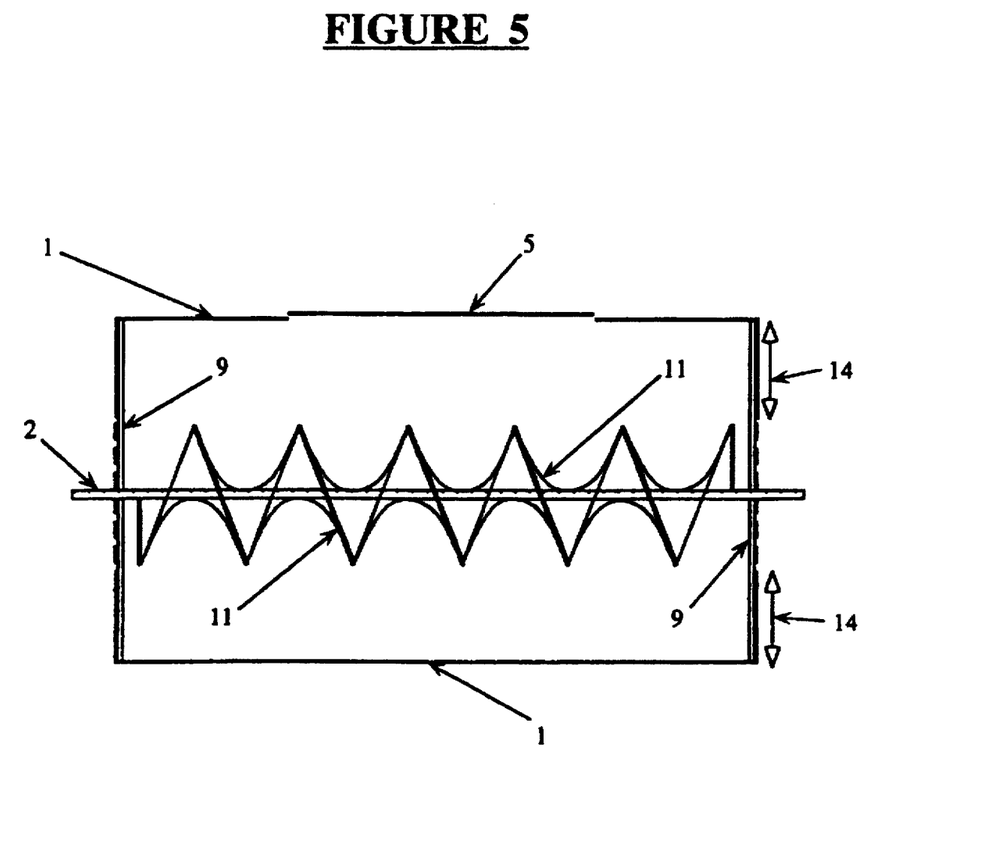
FIG. 5 is a schematic depiction of a longitudinal cross-section of the cylindrical chamber of the water treatment device shown in FIGS. 1 and 2.

As an alkaline solution/suspension is generated within the chamber 1, a spiral water impellor 11 shown in FIG. 5 which will rotate with the chamber 1, will direct water through and out of the chamber I and into the surrounding body of water. Alternatively the motorised dispersion paddle 6 shown in FIGS. 1 and 3 may achieve the same object.

It is to be understood that the inventive concept in any of its aspects can be incorporated in many constructions so that the generality of the preceding description is not to be superseded by the particularity of the attached drawings. Various alterations, modifications and/or additions may be incorporated into the various constructions and arrangements of parts without departing from the spirit and ambit of the invention.

The claims, illustrations, photographs and drawings form part of the disclosure of this specification as does the description, claims, illustrations, photographs and drawings of any associated provisional or parent specification or of any priority document all of which are imported hereinto as part of the record thereof.

I claim:

1. A device for treating a fluid in a fluid reservoir, said device comprising:
   a chamber,
   loading means arranged to facilitate supply of treatment reagent particles into said chamber,
   holding means for supporting said chamber partially submerged in the fluid reservoir,
   inlet/outlet means for allowing fluid from the fluid reservoir to pass into said chamber and mix with said particles, and to facilitate return of fluids treated in said chamber into said fluid reservoir, and
   drive means for rotating said chamber about an axis to effect crushing and/or abrading of the treatment reagent particles in said chamber and facilitate mixing of said particles with said fluid.

2. A device according to claim 1, wherein said chamber is a cylinder provided with circular end parts and said inlet/outlet means comprise one or more openings provided in at least one of the circular end parts.

3. A device according to claim 2, wherein said loading means comprise a trap door provided in the wall of the cylinder.

4. A device according to claim 2, wherein the one or more openings are provided with a mesh cover fitted thereover to minimize loss of undissolved reagent from the chamber.

5. A device according to claim 1, wherein said holding means comprise at least one buoyancy pontoon provided with a supporting structure for holding a shaft in which said chamber is mounted for axial rotation about said shaft with said chamber in a partially submerged state.

6. A device according to claim 1 including flow means which are adapted to facilitate fluid flow between the chamber and the reservoir.

7. A device according to claim 6, wherein said flow means comprise a motorised paddle or propeller provided adjacent one end of said chamber and/or, a spiral water impellor provided along the axis of rotation of the chamber, and/or, a pump for pumping fluid through the chamber, and/or, flights provided on the outer surface of the ends of the chamber.

8. A device according to claim 1 having one of more service platforms.

9. A device according to claim 1, wherein the inner wall of the cylinder forming part of said chamber includes internal mixer flights adapted to facilitate the effect of abrasion, crushing, mixing and/or dispersion of water treatment reagents as the chamber rotates.

10. A device according to claim 1, wherein said inlet/outlet means are arranged to allow fluid to flow into said chamber in such a manner that the level of fluid in the chamber is substantially the same as the level of fluid in the reservoir.

11. A device according to claim 1, wherein said drive means comprise a motor and at least one resilient belt wrapped around said chamber, said belt being driven through a pulley coupled to said motor.

12. A method for treating fluid in a fluid reservoir, said method comprising:
   suspending a chamber partially submerged in reservoir of fluid, flowing fluid from the reservoir into the chamber and back into the reservoir, and adding fluid treatment reagent particles to said fluid the chamber, rotating the chamber to effect crushing and/or abrading of the treatment reagent particles in the chamber and to facilitate mixing of said particles with said fluid.

13. A method according to claim 12, wherein the fluid is acid or phosphate polluted or turbid or discoloured water or water having excessive dissolved solids, or water polluted by algal growth.

14. A method according to claim 12, wherein the reagent is chosen from calcium oxide, calcium hydroxide, calcium carbonate, carbide lime, caustic magnesia, magnesite, dolomite, alum, biogenic carbonate, witherite, barium oxide, sodium hydroxide, activated carbon products and/or mixtures thereof.

15. A method according to claim 12, wherein the fluid is acid polluted water and the reagent is calcium oxide, calcium hydroxide, calcium carbonate and/or mixtures thereof.

16. A method according to claim 12, wherein abrasives are added to the chamber to abrade and crush treatment reagent particles.

17. A device for treating fluid in a fluid reservoir, said device comprising:

a chamber;

holding means for supporting said chamber partially submerged in a fluid to be treated;

loading means for facilitating supply of treatment reagent particles into said chamber;

inlet/outlet means for allowing fluid from the fluid reservoir to pass into said chamber, mix with said particles and facilitate return of fluids treated in said chamber into the fluid reservoir, drive means for rotating the chamber about an axis for mixing the treatment reagent particles with the fluid, and mechanical means within the chamber to interact with said treatment reagent particles as said chamber rotates about said axis for causing crushing or abrading of treatment reagent particles.

18. A device according to claim 17, wherein said mechanical means are high density, hard spherical elements which interact with and crush treatment reagent particles.

19. A device according to claim 17, wherein said mechanical means are abrasive particles and wherein said chamber includes mixer flights on the interior surface of said chamber for facilitating the mixing of the treatment reagent particles with the abrasive particles for abrading treatment reagent particles.

* * * * *